United States Patent
Stal

(10) Patent No.: US 8,656,864 B2
(45) Date of Patent: Feb. 25, 2014

(54) SAFETY DEVICE FOR A DUNG SCRAPING DEVICE

(75) Inventor: Adam Stal, Sollentuna (SE)

(73) Assignee: DeLaval Holding AB, Tumba (SE)

( * ) Notice: Subject to any disclaimer, the term of this patent is extended or adjusted under 35 U.S.C. 154(b) by 28 days.

(21) Appl. No.: 13/522,978

(22) PCT Filed: Jan. 26, 2011

(86) PCT No.: PCT/EP2011/051042
§ 371 (c)(1),
(2), (4) Date: Jul. 19, 2012

(87) PCT Pub. No.: WO2011/095419
PCT Pub. Date: Aug. 11, 2011

(65) Prior Publication Data
US 2012/0291714 A1 Nov. 22, 2012

Related U.S. Application Data

(60) Provisional application No. 61/301,675, filed on Feb. 5, 2010.

(30) Foreign Application Priority Data

Feb. 5, 2010 (SE) ...................................... 1050118

(51) Int. Cl.
*A01K 1/01* (2006.01)
(52) U.S. Cl.
USPC .......................................... 119/451; 198/718
(58) Field of Classification Search
USPC ............................ 119/451, 450, 530; 198/718
See application file for complete search history.

(56) References Cited

U.S. PATENT DOCUMENTS 3,577,956 A * 5/1971 Forster .......................... 119/451
3,805,741 A * 4/1974 Thompson et al. ........... 119/510
3,827,402 A * 8/1974 Laurenz ........................ 119/445

(Continued)

FOREIGN PATENT DOCUMENTS

CN 1477924 A 2/2004
CN 201015343 Y 2/2008

(Continued)

OTHER PUBLICATIONS

International-Type Search Report, dated Jul. 27, 2010, from corresponding PCT application.

(Continued)

*Primary Examiner* — Yvonne Abbott
(74) *Attorney, Agent, or Firm* — Young & Thompson

(57) ABSTRACT

A dung scraping device includes a safety system, a dung scraper (13) and a driving mechanism (17, 18) adapted to drive the dung scraper along a floor surface (11*a*) for animals such that the dung scraper pushes dung on the floor surface to a cross channel (14) located at an end portion (11*d*) of the floor surface). The safety system includes height detecting unit (20-22, 29) arranged to detect the presence of foreign objects having at least a predetermined height (x) above the floor surface and an emergency stop device (19, 26) arranged to receive information from the height detecting unit and to deactivate the driving mechanism when such a foreign object having the predetermined height (x) above the floor surface is detected such that the dung scraper is automatically emergency stopped before the foreign object is pushed into the cross channel.

19 Claims, 3 Drawing Sheets

(56) References Cited

U.S. PATENT DOCUMENTS

| | | | |
|---|---|---|---|
| 3,860,109 A | | 1/1975 | Benzmiller |
| 3,960,110 A | * | 6/1976 | Laurenz .................. 119/451 |
| 4,280,447 A | * | 7/1981 | Laurenz .................. 119/451 |
| 5,289,912 A | * | 3/1994 | Faulstich ................. 198/718 |
| 5,477,812 A | | 12/1995 | Waters |
| 6,532,901 B2 | | 3/2003 | Isley et al. |
| 6,851,390 B2 | | 2/2005 | Lindvall |
| 2001/0035304 A1 | | 11/2001 | Berg |
| 2008/0257267 A1 | | 10/2008 | Osthues et al. |

FOREIGN PATENT DOCUMENTS

| | | |
|---|---|---|
| CN | 201078940 Y | 7/2008 |
| EA | 200601539 A1 | 6/2007 |
| EP | 0 943 235 A2 | 9/1999 |
| EP | 1 557 082 A1 | 7/2005 |
| RU | 2 304 381 C2 | 8/2007 |
| SU | 954071 A1 | 8/1982 |
| WO | 0243472 A1 | 6/2002 |
| WO | 2008/118005 A1 | 10/2008 |

OTHER PUBLICATIONS

International Search Report, dated May 6, 2011, from corresponding PCT application.

Supplementary International Search Report, dated May 24, 2012, from corresponding PCT application.

Chinese Office Action, dated Jul. 25, 2013, from corresponding CN application.

* cited by examiner

SAFETY DEVICE FOR A DUNG SCRAPING DEVICE

BACKGROUND OF THE INVENTION AND PRIOR ART

The present invention relates to a safety system for a dung scraping device, wherein the dung scraping device comprises a dung scraper and a driving mechanism adapted to drive the dung scraper along a floor surface for animals such that the dung scraper pushes dung on the floor surface to a cross channel located at an end portion of the floor surface.

Usually, a dung scraper moves back and forth along an elongated walking area for cows in a barn. A cross channel is arranged at at least one end of the elongated walking area. The dung scraper moves the dung on the floor surface in the walking area to the cross channel. The dung scraper may be provided with a safety system stopping the dung scraper if it comes in contact with a heavy object on the walking area such as, for example, a part of a cow. However, calves and especially small calves are essentially lighter than cows. If a dung scraper comes in contact with a part of a small calf, it is not certain that the dung scraper will be stopped. In this case, there is a risk that the dung scraper moves the calf together with the dung along the walking area to the cross channel. If the calf falls down into the cross channel, it will be moved away together with the dung by means of a dung transportation device which transports dung from one or several walking areas to a dung storing space. If a calf falls down into the cross channel, it may be seriously injured or die.

SUMMARY OF THE INVENTION

The object of the present invention is to provide a safety device preventing small animals such as calves from being pushed down into a cross channel by a dung scraper moving along a floor surface for animals.

This object is obtained, according to the invention, by the feature that the safety system comprises detecting means arranged to detect the presence of foreign objects having at least a predetermined height above the floor surface and an emergency stop device arranged to receive information from said detecting means and to deactivate said driving means in case such a foreign object having the predetermined height above the floor surface is detected such that the dung scraper is automatically emergency stopped before the foreign object is pushed into the cross channel. If, for example, operators in a barn have not observed that a cow has given birth to a calf on the floor surface, there is a great risk that the dung scraper moves the calf together with the dung to a cross channel before the calf is able to stand on its legs. It is also possible that a small animal like a calf may fall down on the floor surface when it comes in contact with a dung scraper and be pushed into the cross channel. The emergency stop device can stop the dung scraper as soon as the detecting means detects a foreign object of the predetermined height which may be a calf. Thereby, it is possible to save substantially all calves from being pushed into the cross channel by the dung scraper.

According to a preferred embodiment of the invention, said detecting means is arranged to detect the presence of such foreign objects at an end portion of a floor surface on which the dung scraper moves back and forth. If a foreign object such as a small calf is detected on the floor surface in a position very close to the cross channel, there is a great risk that the calf will be pushed down into the cross channel by the dung scraper. The detecting means may be arranged to detect the presence of such foreign objects in said end portion at a distance of 20 to 100 cm from the cross channel. In order to avoid that the dung scraper pushes a calf down into the cross channel, the dung scraper has to be emergency stopped at a certain distance from the cross channel.

According to another preferred embodiment of the invention, the detecting means is arranged to detect the presence of foreign objects which are higher than the height of the dung scraper. Dung has a more or less liquid consistency. Thereby, the dung flows over the upper edge portion of the dung scraper if too much dung is moved towards the cross channel. Consequently, the height of the dung will not be higher than the height of the dung scraper. Due to this fact, it is possible for the dung scraper and the dung to be moved past the detecting means without activating the emergency stop device. In case that the detecting means detects an object having a higher height than the dung scraper, the object is a foreign object that should not be moved to the cross channel. In case that a small animal is moved towards the cross channel by the dung scraper, usually at least a part of the animal will stick up above the height level of the dung scraper. Thereby, the detecting means detects the presence of the animal and the dung scraper is emergency stopped before the animal is pushed into the cross channel.

According to another preferred embodiment of the invention, said detecting means is arranged on a stationary element on at least one side of said end portion. Such a stationary element may be an already existing element such as a fence element or a post element. Said detecting means may comprise a light source emitting a light beam across said end portion of the floor surface and a sensor arranged to sense when an object breaks the light beam. Such detecting means are simple and they have a reliable function. Preferably, the light source is arranged to emit an IR beam across said end portion. Alternatively, other kind of electromagnetic light may be used to form the light beam such as visible light, ultraviolet light and laser light.

According to another preferred embodiment of the invention, said light source and the sensor are arranged on opposite sides of said end portion. In this case, the light source forms a light beam hitting the sensor on the opposite side of the end portion of the floor surface. If the light beam is broken by a foreign object, the sensor will not detect the light beam and the control unit activates the emergency stop device. Alternatively, said light source and the sensor are arranged on the same side of said end portion and the detecting means comprises a reflecting member arranged on the opposite side. In this case, the light source and the sensor may constitute a unit.

According to a further alternative, the detecting means comprises a three dimensional camera. By means of such a camera it is possible to detect objects of a predetermined height in the end portion of the floor surface. The camera may be arranged at one side of said end portion or in a position above the end portion. The detecting means may comprise a computer unit or the like with a suitable software by which it is possible to analyze imagines from the camera and detect foreign objects having at least said predetermined height.

According to a further embodiment of the invention, said control means comprises a switch member arranged to break the energy supply to the drive mechanism of the dung scraper in case such a foreign object is detected in said end portion. By switching off the energy supply to the drive mechanism, the dung scraper will immediately be stopped. The emergency stop device may comprise a manually maneuverable member which has to be used for restarting the dung scraper when it has been emergency stopped. Thus, it is only possible to restart the dung scraper manually. An operator restarts the dung scraper when the detected foreign object has been removed from said end portion of the floor surface. Preferably, the manually maneuverable member is placed in the vicinity of the end portion of the floor surface.

According to a further embodiment of the invention, the emergency stop device is arranged to receive information about the position of the dung scraper on the floor surface and the emergency stop device is arranged to stop the dung scraper only in case such a foreign object is detected in said end portion at the same time as the dung scraper is located in said end portion. If the dung scraper is not located in said end portion, there is no risk, at least for the moment, that a detected object is pushed down into the cross channel by the dung scraper. The detected object may here be an operator or a cow which are temporarily in said end portion. In this way, it is possible to avoid incorrect emergency stopping of the dung scraper.

According to a further embodiment of the invention, the safety system comprises an alarm device that is activated when the dung scraper has been emergency stopped. An alarm device draws attention to the fact that the dung scraper has been emergency stopped. An operator in the barn pays attention to the alarm, moves to the dung scraper and removes the detected object. If the object is a calf, it is saved by means of the safety system. The alarm device may be arranged to generate a visible alarm signal and/or an audible alarm signal when the dung scraper has been emergency stopped. A visible or audible signal draws attention to an emergency stop in a reliable manner. The alarm device may be arranged to send information to a communication apparatus used by an operator when the dung scraper has been emergency stopped. In this case, it is possible to inform an operator in an alternative manner about an emergency stopped dung scraper. The operator may here be at a relative long distance from the dung scraper.

BRIEF DESCRIPTION OF THE DRAWINGS

In the following, preferred embodiments of the invention are described by examples and with references to the attached drawings, in which.

BRIEF DESCRIPTION OF PREFERRED
EMBODIMENTS OF THE INVENTION

Figure 1:
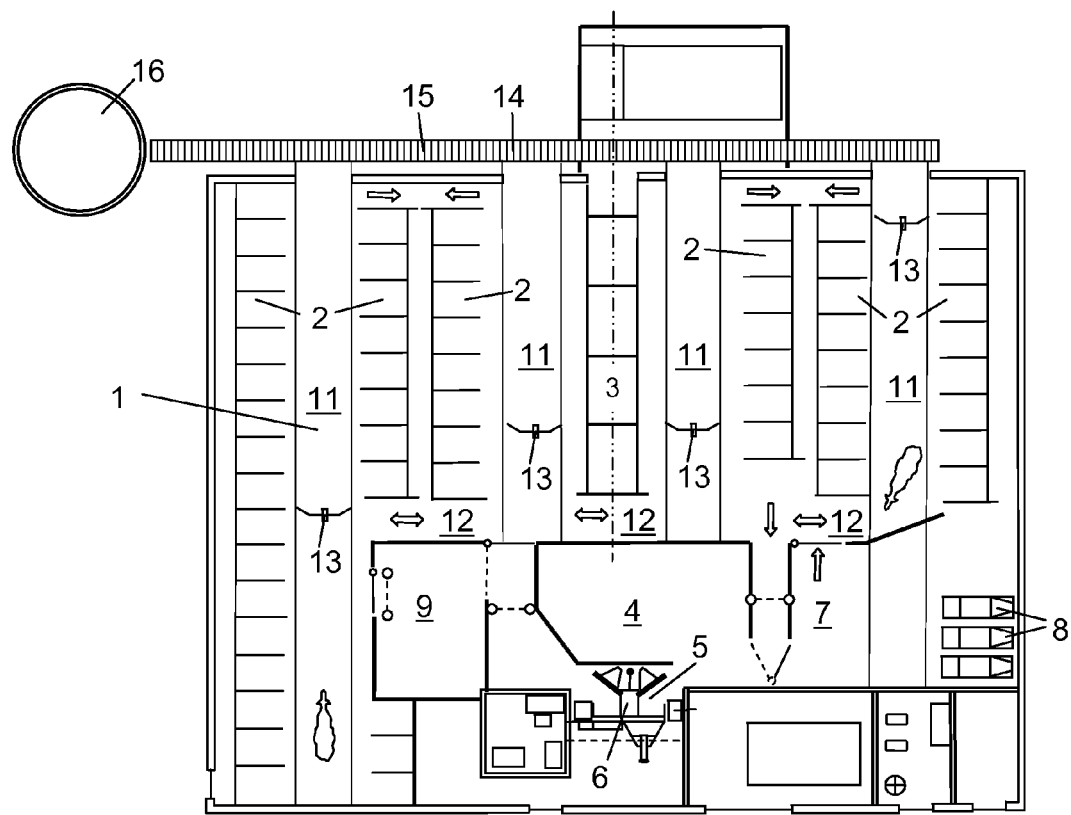
FIG. 1 shows a barn provided with a number of dung scraping devices provided with a safety system according to the present invention.

FIG. 1 shows a barn for about 60 milking cows. In this case, the barn comprises a roughage feeding area 1 including resting areas 2 and an elongated feeding table 3 for the cows. The barn comprises further a milking area 4 provided with a voluntary milking station 5. A milking robot 6 attaches teat cups to the cows in milking station 5. Furthermore, the barn comprises a concentrate feeding area 7, which is provided with concentrate feeding stations 8, and a separation and treatment area 9.

The roughage feeding area 1 constitutes the main part of the barn. The roughage feeding area 1 comprises four elongated walking areas 11 for the cows. A row of cubicles including resting areas 2 is arranged along the sides of the walking areas 11. The roughage feeding area 1 comprises passages 12 connecting the walking areas 11. The passages 12 make it possible for the cows to walk substantially freely in the whole roughage feeding area 1. Each walking area 11 comprises a dung scraper 13. The dung scrapers 13 move back and forth along the elongated walking areas 11. The dung scrapers 13 transport the dung in the walking areas 11 to a common cross channel 14 located at an end of the elongated walking areas. A dung transportation device 15 transports the dung in the common cross channel 14 to a storing space 16.

Figure 2:
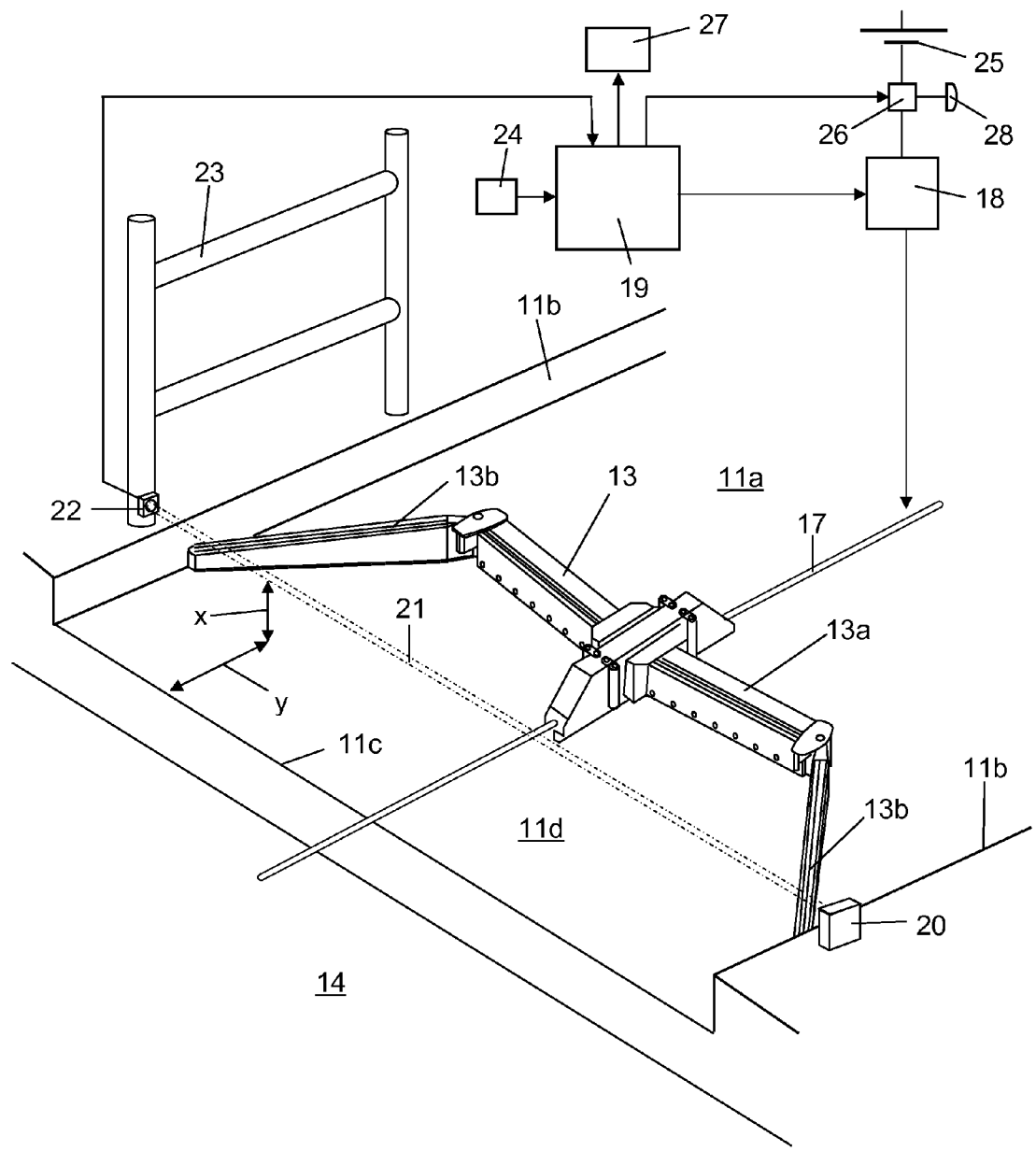
FIG. 2 shows a dung scraping device and a safety system according to a first embodiment and FIG. 3 shows a dung scraping device and a safety system according to a second embodiment.

FIG. 2 shows a dung scraper 13 in the walking area 11. The walking area 11 is formed by a sunken floor surface 11a and vertical side surfaces 11b. The dung scraper 13 comprises a centre portion 13a and two side portions 13b each pivotally connected to the centre portion 13a. The dung scraper 13 is moved back and forth along the floor surface 11a by means of a drive mechanism 18. The drive mechanism 18 comprises a drive cable 17 connected to the centre portion 13a of the dung scraper 13. The drive cable 17 may be hydraulically driven. A control unit 19 is arranged to control the drive mechanism 18 and the motion of the dung scraper 13 along the walking area 11.

When the dung scraper 13 is moved in a forward direction towards the cross channel 14, the side portions 13b of the dung scraper 13 are automatically angled outwardly such that their free ends come in contact the vertical side surfaces 11b of the walking area 11. When the side portions 13b of the dung scraper 13 are in this position, the dung scraper 13 extends along the whole width of the walking area 11. Thereby, all dung located on the floor surface 11a in front of the dung scraper 13 will be pushed towards the cross channel 14 by the dung scraper 13 when it is moved towards the cross channel. The dung scraper 13 is automatically stopped in a front end position of the walking area 11. In this position, the centre portion 13a of the dung scraper 13 is very close to a front end edge 11c of the walking area 11 and the cross channel 14. When the dung scraper 13 reaches this front end position, substantially all dung in front of it has been pushed down into the cross channel 14.

The control unit 19 then activates the driving mechanism 18 such that the dung scraper 13 starts to move backwards along the walking area 11. During the backward motion, the side portions 13b of the dung scraper 13 are free to pivot inwardly such that gaps are formed between the vertical side surfaces 11b of the walking area 11 and the dung scraper 13. The dung on the floor surface 11a behind the dung scraper 13 will pass through these gaps when the dung scraper 13 moves backwards. The control unit 19 stops the drive mechanism 18 when the dung scraper 13 has reached a rear end position in the walking area 11. Thereafter, the control unit 19 activates the driving mechanism 18 such that it again moves the dung scraper 13 in a forward direction towards the cross channel 14.

Each dung scraper 13 is provided with a safety system. The safety system is arranged to prevent foreign objects of a certain size, such as calves, from being pushed into the cross channel 14 by the dung scraper 13. There is a risk for especially small calves to be pushed into the cross channel 14 by the dung scraper 13. If a calf has been pushed into the cross channel 14, it may be seriously injured or die. The safety system comprises a light source 20 arranged on one side of a front end portion 11d of the walking area 11 in the vicinity of the cross channel 14. The light source is here exemplified as an infrared light source 20 emitting an infra red beam 21 across the walking area 11. An infrared sensor 22 is arranged on the opposite side of the walking area 11. The IR-sensor 22 is here arranged on a stationary fence element 23 on one side of the walking area 11. The IR-source 20 may also be arranged on an already existing fence element 23 on the opposite side of the walking area 11.

The IR-beam 22 has to be arranged at a somewhat higher height x above the floor surface 11a than the height of the dung scraper 13 such that it will not be broken by the dung scraper 13 when it moves dung to the cross channel 14. In case that a calf is moved towards the cross channel by the dung scraper 13, usually at least a part of the calf will stick up above the height level of the dung scraper 13. Thereby, the IR-beam 22 will be broken by the calf. Furthermore, the IR-beam has to be arranged at a distance y from the front end edge 11c of the walking area 11 such that the dung scraper 13 is emergency stopped at a safe distance from the front end edge 11c of the walking area 11. Thereby, there is substantially no risk that the calf falls down into the cross channel 14. The distance y may be in the range of 20-100 cm.

The IR-sensor 22 is connected to the control unit 19. The control unit 19 receives information from the IR-sensor 22 at least when the IR-beam 21 has been broken. The control unit 19 receives also information about the position of the dung scraper 13 on the walking area 11. In this case, the control unit receives information from a second position sensor 24 about the position of the dung scraper 13. The drive mechanism 18 is powered by a power source 25 which may, for example, be an electric power source. A switch member 26 is arranged between the power source 25 and the drive mechanism 18. The switch member is switchable to an on and off state. The control unit 19 is connected to an alarm device 27.

During operation of the dung scraper 13, it moves back and forth along the floor surface 11a. The dung scraper 13 moves dung from walking area 11 to the cross channel 14. The IR-beam 21 is arranged at a height above the floor surface 11a such that dung scraper 13 and the dung to the cross channel 14 are able to pass under the IR-beam 21. If a calf or another foreign object having a height corresponding to the height x of the IR-beam is moved to the end portion 11d of the walking area 11, such an object will break the IR-beam 21. The control unit 19 receives information from the IR-sensor 22 when this occurs. The control unit 19 also receives information from the position sensor 24 about the position of the dung scraper 13. In case both a foreign object and the dung scraper are detected in said front end portion 11d, the control unit 19 switches the switch member 26 to the off state such that the power supply from the power source 25 to the driving mechanism 19 is broken. The dung scraper 13 is emergency stopped and the control unit 19 activates the alarm device 27.

The alarm device 27 may generate a visible alarm signal and/or an audible alarm signal. Alternatively or in combination, the alarm device 27 sends information to a communication apparatus used by an operator in the barn when the scraper has been emergency stopped. Such a communication apparatus may be a mobile phone or the like. The alarm device 27 draws attention to the fact that a dung scraper 13 has been emergency stopped. The operator in the barn moves to the dung scraper 13 and removes the object which has broken the IR-beam 21. If the object is a calf, it is saved by means of the safety system. In order to restart the dung scraper 13, the operator has to use a manually maneuverable member 28. In the case that the dung scraper 13 is not in the front end portion 1id of the walking area 11d when the IR-beam 21 is broken, the control unit 19 will not switch the switch member 26 to the off state. In this case, the IR-beam 21 is not broken by an object moved to the front end portion 11d by the dung scraper 13. In this case, the IR-beam may be broken by a cow or an operator situated in the front end portion 11d of the walking area 11d.

Figure 3:
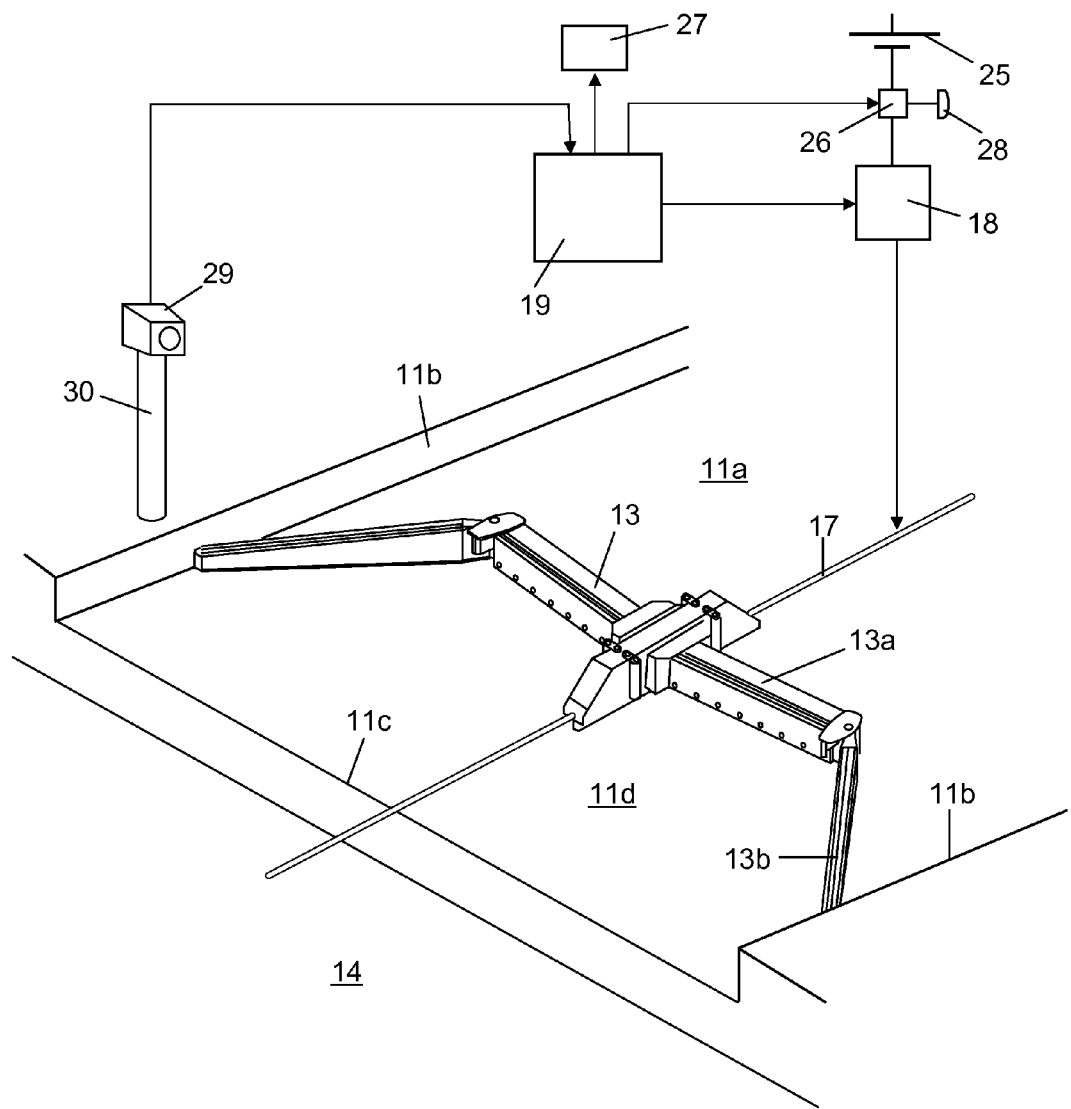

FIG. 3 shows an alternative embodiment of the safety system. In this case, a three-dimensional camera 29 is used for detecting foreign objects having a predetermined height above the floor surface 11a in the front end portion 11d of the walking area 11 in the vicinity of the cross channel 14. The camera 29 is here arranged on a stationary element in the form of a post element 30 on one side of the front end portion 11d of the walking area 11. Alternatively, the camera 29 may be arranged in a position above the front end portion 11d of the walking area 11. In this case, the camera 29 may be arranged on a roof element or on a stationary element extending above the front end portion 11d of the walking area 11. The control unit 19 receives and analyses images from the camera 19 substantially continuously. If the control unit 19 receives images indicating both a foreign object of said predetermined height and the dung scraper 13 in the frond end portion 11d, the control unit 19 switches the switch member 26 to an off state such that the power supply to the drive mechanism 18 is broken. The control unit 19 activates the alarm device 27 and an operator draws attention to the fact that the dung scraper 13 has been emergency stopped. The operator moves to the dung scraper 13 and removes the object/calf from the front end portion lid of the walking area 11. The operator restarts the dung scraper 13 by means of the manually maneuverable member 28.

The invention is not limited to the described embodiments but may be varied and modified freely within the scope of the claims. The dung scraper may, for example, have a substantially arbitrary design.

The invention claimed is:

1. A safety system for a dung scraping device arranged to push dung on a floor surface (11a) to a cross channel (14) located at an end portion (11d) of the floor surface (11a), the dung scraping device comprising a dung scraper (13) operatively connected to a driving mechanism (17, 18), the driving mechanism (17, 18) controlled to drive the dung scraper (13) back and forth along the floor surface (11a) such that the dung scraper (13) pushes dung on the floor surface (11a) to the cross channel (14), the safety system comprising:

a height detecting unit (20-22, 29) arranged to detect the presence of foreign objects having at least a predetermined height (x) above the floor surface (11a); and an emergency stop device (19, 26) arranged to receive information from said height detecting unit (20-22, 29) and, when the received information indicates that the height detecting unit has detected the presence of a foreign object at the predetermined height (x) above the floor surface, to deactivate said driving mechanism (17, 18), automatically emergency stopping the dung scraper (13) before the dung scraper (13) pushes the detected foreign object into the cross channel (14).

2. A safety system according to claim 1, wherein said height detecting unit is arranged to detect the presence of such foreign objects at the end portion (11d) of the floor surface (11a).

3. A safety system according to claim 2, wherein said height detecting unit (22) is arranged on a stationary element (23, 30) on at least one side of said end portion (11d).

4. A safety system according to claim 1, wherein the height detecting unit is arranged to detect the presence of the foreign object in said end portion (11d) at a distance of 20 to 100 cm from the cross channel (14).

5. A safety system according to claim 4, wherein said height detecting unit (22) is arranged on a stationary element (23, 30) on at least one side of said end portion (11d).

6. A safety system according to claim 1, wherein the predetermined height (x) above the floor surface (11a) is a height higher than a height of the dung scraper (13).

7. A safety system according to claim 1, wherein said height detecting unit comprises:

a light source (20) emitting a light beam (21) across said end portion (11d) of the floor surface (11a); and a sensor (22) arranged to sense when the foreign object breaks the light beam (21), the sensor (22) sensing that the foreign object breaks the light beam (21) providing a detection of the presence of the foreign object having at least the predetermined height (x) above the floor surface (11a).

8. A safety system according to claim 7, wherein the light source (20) is an IR beam light source (21).

9. A safety system according to claim 7, wherein said light source (20) and the sensor (22) are arranged on opposite sides of said end portion (11d).

10. A safety system according to claim 7, wherein said light source (20) and the sensor (22) are arranged on the same side of said end portion (11d) and the height detecting unit further comprises a reflecting member arranged on an opposite side of said end portion (11d) positioned to reflect light from said light source (20) to the sensor (22).

11. A safety system according to claim 1, wherein the height detecting unit comprises a three dimensional camera positioned to detect the presence of the foreign object at the predetermined height (x) above the floor surface (11a).

12. A safety system according to claim 1, wherein said emergency stop device comprises a switch member (26) arranged to break an energy supply to the drive mechanism (17, 18) of the dung scraper (13) when the height detecting unit has detected the presence of the foreign object having the predetermined height (x) above the floor surface the foreign object in said end portion (11d).

13. A safety system according to claim 1, wherein the emergency stop device comprises a manually maneuverable member (28), the emergency stop device configured to require operator use of the manually maneuverable member (28) to re-start the dung scraper (13) when the emergency stop device has emergency stopped the dung scraper (13).

14. A safety system according to claim 1, further comprising:

a dung scraper position sensor (24) arranged to provide information to the emergency stop device of a position of the dung scraper (13) on the floor surface (11a), wherein the emergency stop device is arranged to stop the dung scraper (13) only in a case when the foreign object is detected in said end portion (11d) by the height detecting unit at the same time as the dung scraper is located in said end portion (11d) by said dung scraper position sensor (24).

15. A safety system according to claim 1, further comprising an alarm device (27) operatively connected to the height detecting unit and activated when the dung scraper (13) has been emergency stopped.

16. A safety system according to claim 15, wherein the alarm device (27) is arranged to generate at least one of a visible alarm signal and an audible alarm signal when the dung scraper (13) has been emergency stopped.

17. A safety system according to claim 15, wherein the alarm device (27) is arranged to send information to a communication apparatus used by an operator when the dung scraper (13) has been emergency stopped.

18. A safety system according to claim 1, wherein the predetermined height (x) above the floor surface (11a) is a height of a new-born calf.

19. A safety system according to claim 1, wherein the predetermined height (x) above the floor surface (11a) corresponds to a height of a new-born calf fallen on the floor surface (11a).

* * * * *